United States Patent Office 3,390,107
Patented June 25, 1968

3,390,107
PROCESS FOR PREPARING A CELLULAR FURAN RESIN AND PRODUCT OBTAINED THEREFROM
Irving Tashlick, Rockaway Township, Morris County, and Gabriel M. Grudus, Rockaway, N.J., assignors to International Pipe & Ceramics Corporation, East Orange, N.J., a corporation of Delaware
No Drawing. Filed June 24, 1965, Ser. No. 466,820
6 Claims. (Cl. 260—2.5)

ABSTRACT OF THE DISCLOSURE

The disclosure concerns a rigid, cellular, expanded furan resin. It is prepared by polymerizing a reaction mixture consisting essentially of a liquid furan resin, an acid catalyst and a blowing agent.

---

The present invention relates to new and useful products in the nature of foamed, cellular resins. More particularly, the present invention is concerned with foamed synthetic furan resins and with processes for their preparation.

It has been suggested that cellular materials can be produced by converting a solution of hardenable urea-formaldehyde, phenol-formaldehyde or thiourea-formaldehyde condensation products into a foam-like mass by vigorous stirring or beating the solution while adding a foam-forming agent and an acid catalyst. The acid catalyst is said to accelerate the hardening of the condensation products in the expanded state. Difficulties have been encountered in producing such cellular materials and the products produced, in many instances, have left much to be desired. Thus, for example, cellular urea-formaldehyde, thiourea-formaldehyde and phenol-formaldehyde condensation products so produced have had a limited utility especially in applications involving a prolonged high temperature and a non-oxidative corrosive environment, by reason of their relatively low heat distortion temperature and poor chemical resistance. Such condensation products have also been costly to manufacture due to the difficulty in drying the expanded materials.

It is an object of the present invention to provide a cellular furan resin having excellent chemical resistance to strong alkali, non-oxidizing acids and organic solvents.

It is another object of this invention to provide a synthetic cellular furan resin having a low, medium or high density depending upon the particular manner of formulation.

Still another object of the present invention is to produce a cellular furan resin having a low thermal conductivity and a high heat distortion temperature.

A further object of the present invention is to provide a cellular furan resin having good compressive and flexural strengths.

Another object of the present invention is to provide an insulating cellular furan resin for use at prolonged high temperatures (300° F. and higher) and in a non-oxidative corrosive environment.

An additional object of this invention is to provide a highly efficient and economic process for the production of a solid, cellular furan resin.

Yet another object of the present invention is to provide a highly efficient and economic process for the production of a solid, cellular, synthetic furan resin having a density ranging from about 1 to about 35 pounds per cubic foot (p.c.f.), the specific density depending upon the particular manner of formulation.

Other objects and advantages of the present invention will be apparent to those skilled in the art from the following detailed description and examples.

According to the present invention an expanded cellular furan resin is produced by uniformly dispersing a blowing agent and acid catalyst in a furan resin and allowing the composition to exotherm. A foam results which gels and finally hardens. Generally 1 to 25 parts by weight of a blowing agent is dispersed in about 100 parts by weight of a furan resin following by the addition of about 1 to 10, preferably 3 to 6 parts, by weight of an acid catalyst. If desired external heat can be applied during the reaction. A suitable reaction temperature is about 50 to 70° C. although the reaction temperature is not critical.

The cellular synthetic furan resins of the present invention are generally of a partial open cell structure and in contrast to cellular polymeric polyurethanes prepared for example by interacting a polyisocyanate with a hydroxy-ended polymer of tetrahydrofuran, in the presence of water and a catalyst, contain a multiplicity of furan nuclei.

In another aspect of this invention, it has been found that depending on the specific process conditions employed, a low, medium or high density cellular furan resin can result. Thus, for example, a low density cellular furan resin is produced by increasing the proportion of the blowing agent, and/or using a less highly condensed furan resin or using one containing a significant amount (1–25% by weight) of furfuryl alcohol, i.e. one with a lower average degree of polymerization. Such a resin will have a lower initial viscosity and will produce more water as a result of the condensation reaction, the water volatilizing and acting as an additional blowing agent when the temperature of the mixture reaches 100° C. due to exotherm. Specifically, low density (about 1 to 8 p.c.f.) cellular furan resins are obtained by combining 100 parts by weight of a liquid furan resin having a viscosity of about 5000 to 35,000 cps. at 23° C. with a preferred viscosity of about 25,000 to 35,000 cps. at 23° C. and containing a significant amount (5 to 20% by weight of free furfuryl alcohol, with 10 to 20 parts of a blowing agent, and 3 to 6 parts of an acid catalyst.

High density (about 20–35 p.c.f.) cellular furan resins on the other hand can be obtained according to the present invention by combining 100 parts, by weight, of a liquid furan resin, having a viscosity of about 25,000 to 100,000 cps. at 23° C. with a preferred viscosity of about 25,000 to 40,000 cps. at 23° C. and containing little to no free furfuryl alcohol (i.e. $<2\%$ by weight) with 1 to 5 parts of a blowing agent, e.g. Freon 113, and 3 to 6 parts of an acid catalyst. There is little tendency here for water to act as a blowing agent and hence the foaming is more easily controlled. The high density cellular furan resins are particularly noted for their good flexural strength and compressive strength for the intended utilities. For example, a cellular furan resin having a density of 20 p.c.f. has a flexural strength of 180 p.s.i.[1] and compressive strength of 1200 p.s.i.[2]

Medium density (about 8 to 20 p.c.f.) cellular furan resins can be obtained by combining 100 parts, by weight, of a liquid furan resin of a viscosity of about 25,000 to 100,000 cps. at 23° C. with a preferred viscosity of about 25,000 to 40,000 cps. at 23° C., with 5 to 10 parts of a blowing agent and 3 to 6 parts of an acid catalyst.

The preferred viscosities are based on the ease of preparation of the cellular material with such furan resins in conventional laboratory equipment.

In preparing the cellular materials of the present invention the liquid furan resins are preferably used. Such resins having a viscosity of about 5000 to 100,000 cps. at ---
[1] Flexural strength measurements have been determined according to ASTM D 790.
[2] Compressive strength measurements have been determined according to ASTM D 1621.

23° C. are synthesized from furfuryl alcohol. They are also commercially available as, for example, Durez 14383.[3]

Also although the liquid furan resins are those preferably prepared from the sole condensation of furfuryl alcohol, it is not intended that the term "liquid furan resin" as used herein be so restricted. Thus, for example, other appropriate furan resins include resins of furfuryl alcohol and furfural; of furfuryl alcohol, furfural and formaldehyde; of furfuryl alcohol and formaldehyde; and of furfuryl alcohol, formaldehyde and phenol. Moreover, any of the above furan resins can be used in admixture with other resins as, for example, polyvinyl butyral, partially hydrolyzed polyvinyl acetate and a liquid phenolic resin.

It is preferred that the liquid furan resin contain no solvents aside from any unpolymerized furfuryl alcohol, furfural and/or a minimum amount of water, i.e. about 0.01 to 1 percent by weight. Resins containing about 1 to 25 percent by weight of furfuryl alcohol and about 1 to 15 percent by weight of furfural are operable. On the other hand, solid furan resins, the term "solid" denoting a resin with a softening point above room temperature, and which can be liquefied by the addition of about 1 to 25 percent of an organic solvent are suitable providing the temperature in the reaction mixture attains and preferably exceeds the boiling point of the solvent by about 10 to 20° C.

The acid catalyst, otherwise termed curing agent, curing accelerator or curing catalyst, includes mineral acids, for example, sulfuric, phosphoric, nitric and hydrochloric acids; organic acids, for example, p-toluenesulfonic, benzene sulfonic, oxalic, maleic and phthalic acids as well as their anhydrides; inorganic salts, for example, aluminum chloride, ferric chloride boron trifluoride and the like; and mixtures of one or more of the foregoing with or without alkyl-, aryl- and alkanol amines and/or amides. A liquid acid catalyst is generally preferred since it can be easily dispersed throughout the liquid resin.

A wide variety of blowing or foaming agents can be used. These include such materials as pressurized inert gases including nitrogen, Freon 113 (trichlorotrifluoroethane), sodium bicarbonate, azo isobutyronitrile and toluene difurfurylcarbamate. Also, in place of foaming techniques the cellular material can be prepared by frothing techniques.

Freon 113 is a preferred blowing agent, it being completely soluble in the furan prepolymer (the term "prepolymer" referring to the furan resin as it is used initially in the blowing reaction). Freon 113 has the chemical formula $CCl_2FCClF_2$ and its boiling point, i.e. 47.3° C. at 1 atmosphere, makes it possible to combine Freon 113 with a liquid furan resin at or near room temperature in open vessels. Moreover, the ready availability of Freon 113 at moderate price, its nonflammability and low level of toxicity and the ease of controllability of the reaction with Freon 113 make Freon 113 especially desirable as a blowing agent.

Although the essential ingredients for preparing the cellular products of this invention are the furan resin, the acid catalyst and the blowing agent, it is within the scope of the present invention to include in the preparation of the resin other components which do not affect the basic characteristics of the cellular material. These include dyes, stabilizers, surfactants, finely divided fillers and the like.

The products of the present invention have a wide variety of utilities. The excellent resistance of the low, medium and high density cellular furan resins of the present invention to strong alkali, non-oxidizing acids and organic solvents as well as the low thermal conductivity, and high heat distortion temperature of such products make them suitable as insulation in areas having a high temperature, for example, 300° F. and above and in areas exposed to non-oxidative corrosive environments. To illustrate the products of the present invention can be used in the shape of bricks to line tanks and reactors and as insulation around outlets and pipes exposed to corrosive fumes.

High density cellular furan resins are particularly useful in the form of bricks or cut sheets as a corrosion resistant insulating lining, i.e. a light weight replacement for carbon brick. Medium density cellular furan resins on the other hand find particular utility as a filter or filter-bed support for use with corrosive non-oxidizing medium. Low density cellular furan resins are especially useful as "foam-in-place" insulation for tanks, ducts and pipes exposed to corrosive atmospheres and/or high temperatures above 200° F.

The following examples are given to aid in understanding the invention but it is to be understood that the invention is not restricted to the specific compositions or conditions of application given in the examples. Said examples are rather only illustrative and should not be construed as limiting the invention which is properly delineated in the appended claims.

Example 1.—Low density cellular furan resin
(about 1 to 8 p.c.f.)

| | Gm. |
|---|---|
| Durez 14383 (liquid furan resin) | 4200 |
| Liquid acid catalyst | 183 |
| Freon 113 | 525 |

To the required amount of Durez 14383 at room temperature in a suitable container (e.g. 5 gal. can), rapidly stirred by a mechanical agitator, was added the Freon 113. After the Freon 113 was completely dissolved the liquid acid catalyst was added over a period of 2 to 5 min. The liquid acid catalyst having a specific gravity of 1.75 was prepared by dissolving a p-toluenesulfonic acid monohydrate in concentrated reagent grades phosphoric acid in the ratio of 33.0 grams of p-toluenesulfonic acid monohydrate to 48.5 ml. of phosphoric acid. The mixture was postmixed for about 3–5 min. to insure a uniform dispersion of the catalyst. At this time the temperature of the mixture was in the range of 50° to 70° C. It was then poured into a suitable mold and allowed to exotherm and blow. The entire foamed mass was next permitted to stand at room temperature for 1 to 2 days to cool and harden sufficiently so that it could be cut into desired specimens. The cutting is not necessary for foam-in-place insulations, i.e. for forming the cellular matreial at the place of application. It has been found that a low density cellular furan resin (3 p.c.f.) has a 0.33 Btu./ft.$^2$/hr./° F./in. with a like value obtained for a medium density cellular furan resin (11 p.c.f.).

Example 2.—High density cellular furan resin
(about 20–35 p.c.f.)

(a) A liquid furan resin was prepared as follows:

To a 22 liter resin flask equipped with a mechanical stirrer, thermometer, a water cooled reflux condenser, dropping funnel, and heated by means of a Glas-col heating mantle was charged 8000 g. (81.5 moles) of furfuryl alcohol and 4000 g. of water containing 4.0 g. (.05% by weight of the furfuryl alcohol) of concentrated (98%) sulfuric acid. The resulting homogeneous solution was heated, with continuous stirring, over a period of about 1 to 1.5 hr., to 90±5° C., at which time the source of heat was removed. The temperature of the mixture continued to rise (due to the exothermic condensation reaction taking place) to a maximum of 98 to 101° C. (maintained at this temperature by the refluxing water). Shortly after the maximum temperature was reached, a dark colored, heavy, insoluble oil layer was seen to separate

---

[3] Durez 14383, available at Hooker Chemical Company, Durez Plastics Division, North Tonawanda, N.Y., is a liquid furan resin containing approximately 10 to 15 percent free furfuryl alcohol with a specific gravity of 1.175. Hooker reports that the liquid furan resin has a viscosity of 350 cps. at 25° C. as an 80 percent solids solution in toluene. The neat Durez 14383, i.e. the material as it is received from Hooker and not as an 80 percent solids solution in toluene has a viscosity of 28,650 cps. at 23° C.

from the water. After the exotherm subsided the heat was reapplied and the temperature maintained at 92±2° C. until a total of 1.5 hours had elapsed after the mixture originally reached 90° C. At the end of this period of time, 60 ml. of a 20% aqueous sodium hydroxide solution was rapidly added by means of the dropping funnel. The mixture was maintained at 90° C. and continuously stirred for 0.75 to 1.0 hour to assure neutralization of the acid present. The stirrer was then stopped and the oil allowed to settle to the bottom of the flask. The bulk of the water layer was siphoned off and discarded.

The resin flask was then equipped for vacuum distillation with a downward condenser and receiver (the mechanical stirring being maintained to prevent bumping).

The residual water and some reaction by-products, e.g. difurylmethane were removed by distillation at reduced pressure until the pot temperature reached 100° C. at 20 mm. (Hg) pressure. The remaining dark oil was allowed to cool to about 50 to 60° C., at which time it was poured into a suitable container. In this manner there was obtained 6155 g. (93% theory, based on the furfuryl alcohol charged) of a liquid furan polymer, having a viscosity of 25,000 to 35,000 cps. at 23° C., an average degree of polymerization (via hydroxyl number) of 4 to 6 and which contained substantially no furfuryl alcohol.

(b) The high density cellular furan resin was prepared as follows:

Seven hundred grams of the liquid furan resin from Example 2(a) was placed in a 2 liter beaker, which was immersed in a constant temperature bath set for 28±1° C. and stirred rapidly with a mechanical agitator. Twenty-eight gm. Freon 113 was added and after the mixture had been equilibrated to 28±1° C. (usually 3 to 5 min. after the Freon 113 has been charged) 26 gm. liquid acid catalyst of Example 1 was added drop-wise over a period of 3.0±0.25 min. Then the entire mixture was post-mixed for 5.0±0.25 min. The temperature at the end of this time was about 45 to 48° C. The beaker was then removed from the 28° C. water-bath and immersed in boiling water (98–100° C.) for 0.75 to 1.50 min. with rapid stirring until the temperature of the mixture reached 53 to 54° C., at which time it was quickly poured into a suitable coated aluminum mold preheated to 70±5° C. After about 2 min. the thus prepared mixture filled the cavity of the mold and gelled immediately after the filling. The temperature at the center of a 9" x 4.5" x 2" foamed mass reached approximately 135° C. 10 min. after the resin was poured into the mold. The mold and the foamed resin contained in it were allowed to stand at room temperature (22 to 28° C.) for about 5 hours and then in an oven at 50° C. for 16 hrs. The cellular, partially cured specimen was then removed from the mold and cured slowly at elevated temperatures in an oven (e.g., 20 hrs. at 90° C.; and finally 20 hrs. at 110° C.).

Example 3.—Medium density cellular furan resin (about 8 to 20 p.c.f.)

| | G. |
|---|---|
| Durez 14383 (liquid furan resin) | 1300 |
| Liquid acid catalyst (as in Example 1) | 45.3 |
| Freon 113 | 104 |

To the above stated amount of Durez 14383 contained in a 2 l. beaker at room temperature and rapidly stirred by a mechanical agitator, was added the Freon 113. After the Freon 113 was completely dissolved the acid catalyst was added over a period of 5 min. The resulting mixture was post-mixed for 6–8 min. to insure a uniform dispersion of the acid catalyst. At this time the temperature of the mixture was in the range of 30–40° C. It was then poured into a suitable mold and allowed to exotherm and blow. The entire foamed mass was then allowed to stand at room temperature for 1 to 2 days to cool and harden. A 15.6 p.c.f. furan foam was thus obtained. A heat treatment of the resulting product at approximately 100° C. for 24 hrs. insured complete cure.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. A process for preparing a rigid, cellular, expanded furan resin which comprises expanding a preformed liquid furan resin of a viscosity of about 5,000 to 10,000 cps. at 23° C. in the presence of an acid catalyst and a blowing agent.

2. Process according to claim 1 wherein the liquid furan resin has a viscosity of about 25,000 to 40,000 cps. at 23° C.

3. Process according to claim 1 wherein the blowing agent is trichlorotrifluoroethane.

4. Process according to claim 1 wherein the acid catalyst is a liquid acid catalyst.

5. Process according to claim 3 wherein the acid catalyst is prepared by dissolving p-toluenesulfonic acid monohydrate in phosphoric acid.

6. As a new composition of matter, a rigid, cellular, expanded furan resin produced according to the process of claim 1.

References Cited

UNITED STATES PATENTS

| 2,416,038 | 2/1947 | Adams | 260—88.5 |
| 2,655,491 | 10/1953 | Edmunds et al. | 260—88.5 |
| 2,698,319 | 12/1954 | Brown et al. | 260—88.5 |
| 2,768,408 | 10/1956 | Strigle et al. | 260—88.5 |
| 2,933,461 | 4/1960 | Mullen. | |
| 3,006,871 | 10/1961 | Sunderland. | |
| 3,051,665 | 8/1962 | Wismer et al. | |
| 3,070,551 | 12/1962 | Brown | 260—88.5 |
| 3,158,592 | 11/1964 | Nielsen | 260—88.5 |

MURRAY TILLMAN, *Primary Examiner.*

M. FOELAK, *Assistant Examiner.*

UNITED STATES PATENT OFFICE
CERTIFICATE OF CORRECTION

Patent No. 3,390,107

June 25, 1968

Irving Tashlick et al.

It is certified that error appears in the above identified patent and that said Letters Patent are hereby corrected as shown below:

Column 2, line 39, after "weight" insert a parenthesis. Column 4, line 30, "Gm." should read -- gm --; line 52, "matreial" should read -- material --; line 64, "moles" should read -- mole --. Column 5, line 58, "G." should read -- g. --. Column 6, line 26, "10,000" should read -- 100,000 --.

Signed and sealed this 11th day of November 1969.

SEAL)
Attest:

Edward M. Fletcher, Jr.
Attesting Officer

WILLIAM E. SCHUYLER, JR.
Commissioner of Patents